US009591629B2

(12) United States Patent
Wang et al.

(10) Patent No.: US 9,591,629 B2
(45) Date of Patent: Mar. 7, 2017

(54) POWER COMPENSATION METHOD, BASE STATION, AND TERMINAL EQUIPMENT

(71) Applicant: FUJITSU LIMITED, Kawasaki-shi, Kanagawa (JP)

(72) Inventors: Yi Wang, Beijing (CN); Yuantao Zhang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 204 days.

(21) Appl. No.: 14/146,443

(22) Filed: Jan. 2, 2014

(65) Prior Publication Data
US 2014/0119322 A1 May 1, 2014

Related U.S. Application Data

(63) Continuation of application No. PCT/CN2011/077222, filed on Jul. 15, 2011.

(51) Int. Cl.
H04W 52/16 (2009.01)
H04W 72/04 (2009.01)
(Continued)

(52) U.S. Cl.
CPC ....... H04W 72/042 (2013.01); H04W 52/143 (2013.01); H04W 52/16 (2013.01);
(Continued)

(58) Field of Classification Search
CPC . H04W 72/042; H04W 52/143; H04W 52/16; H04W 72/04; H04L 5/0053
(Continued)

(56) References Cited

U.S. PATENT DOCUMENTS

2005/0123138 A1* 6/2005 Abe ............... H04B 1/7113 380/255
2008/0019460 A1* 1/2008 Giles ............. H04B 10/541 375/308

(Continued)

FOREIGN PATENT DOCUMENTS

CN 101888690 11/2010
CN 102075233 5/2011

OTHER PUBLICATIONS

Digital Amplitude-Phase Keying with M -ary Alphabets, IEEE Transactions on Communications, vol. COM-22, No. 2, Feb. 1974, C.Melvil Thomas, Member IEEE.*

(Continued)

Primary Examiner — Omer S Mian
Assistant Examiner — Nizam Ahmed
(74) Attorney, Agent, or Firm — Myers Wolin, LLC

(57) ABSTRACT

A power compensation method, base station and user equipment. The method includes: transmitting, by a base station, when an expanded UE-specific PDCCH is amplitude phase keying modulated, a first ratio of the EPRE of the expanded UE-specific downlink control channel to the EPRE of a DM-RS in a first time slot occupied by the expanded UE-specific PDCCH, so that the terminal equipment performs power compensation in decoding the received data transmitted by the base station according to the first ratio, thereby ensuring correct demodulation of the received data by the terminal equipment.

4 Claims, 8 Drawing Sheets

(51) Int. Cl.
    *H04W 52/14*     (2009.01)
    *H04W 52/32*     (2009.01)
    *H04L 5/00*     (2006.01)

(52) U.S. Cl.
    CPC ......... *H04W 52/325* (2013.01); *H04W 72/04* (2013.01); *H04L 5/0053* (2013.01)

(58) Field of Classification Search
    USPC .......................................................... 370/42
    See application file for complete search history.

(56) References Cited

U.S. PATENT DOCUMENTS

| | | | | |
|---|---|---|---|---|
| 2011/0044391 A1* | 2/2011 | Ji | ............... | H04L 5/0007 375/260 |
| 2011/0075581 A1* | 3/2011 | Mihota | ............... | H04B 7/0682 370/252 |
| 2011/0199985 A1* | 8/2011 | Cai | ............... | H04L 1/0026 370/329 |
| 2012/0281646 A1* | 11/2012 | Liao | ............... | H04L 5/0094 370/329 |
| 2013/0003663 A1* | 1/2013 | Blankenship | ............... | H04L 5/0053 370/329 |
| 2013/0034070 A1* | 2/2013 | Seo et al. | ............... | 370/329 |
| 2013/0176979 A1* | 7/2013 | Ohwatari | ............... | H04W 72/046 370/329 |
| 2013/0287064 A1* | 10/2013 | Seo | ............... | H04J 13/18 375/144 |
| 2014/0177531 A1* | 6/2014 | Imamura et al. | ............... | 370/328 |

OTHER PUBLICATIONS

International search report issued for corresponding international application No. PCT/CN2011/077222, mailed Apr. 26, 2012.

First Notification of Office Action issued by the State Intellectual Property Office of China for corresponding Chinese Patent Application No. 201180070887.6, dated Oct. 27, 2015, with an English translation.

Second Notification of Office Action issued by the State Intellectual Property Office of China for corresponding Chinese Patent Application No. 201180070887.6, dated May 6, 2016, with an English translation.

* cited by examiner

POWER COMPENSATION METHOD, BASE STATION, AND TERMINAL EQUIPMENT

CROSS-REFERENCE TO RELATED APPLICATIONS

This is a continuation of International Application No. PCT/CN2011/077222, filed on Jul. 15, 2011, now pending, the contents of which are herein wholly incorporated by reference.

TECHNICAL FIELD

The present invention relates to the field of wireless communications, and in particular to a power compensation method, base station and terminal equipment.

BACKGROUND ART

In a long-term evolution (LTE) system, downlink control information (DCI) is transmitted in a form of a physical downlink control channel (PDCCH) by a base station, and data are transmitted in a form of a physical downlink shared channel (PDSCH) by the base station. Wherein, the PDCCH supports space diversity multi-antenna transmission based on cell-specific reference signals (CRSs), with a maximum number of transmission antennas being 4.

In order to improve data transmission rate and spectral efficiency, multiple antennas are widely used in a wireless communication system. In a long-term evolution advanced (LTE-A) system, a downlink may support up to 8 transmission antennas; however, the PDCCH may only support at most 4 antennas in transmission. In order to further improve performance of a cell-edge user, a coordinated multipoint transmission technology based on a network structure of multiple geographically spaced apart remote radio heads (RRHs) will be widely used in a future wireless communication system. However, as the ability to demodulate a CRS is currently limited, attention is paid to a PDCCH based on a UE-specific demodulation reference signal (DM-RS), where the PDCCH is expanded from previous N orthogonal frequency-division multiplexing (OFDM) symbols to other regions, such as being expanded to a PDSCH region starting from an (N+1)-th symbol.

In such a case, for easy use of the same precoding matrix in the demodulation of the PDSCH, if the ranks of the precoding matrices of the PDCCH and the PDSCH are different, different power allocated for the PDCCH and the PDSCH will result in degradation of the performance of the PDCCH, since the rank of the precoding matrix of the PDCCH is always lower than that of the precoding matrix of the PDSCH. Hence, the power of the PDCCH needs to be increased to compensate for the degradation of the performance. As terminal equipment cannot learn the above change of power, the effect of power on data after channel estimation cannot be eliminated when the terminal equipment receives data and pilots via a wireless attenuation channel, and hence the data cannot be demodulated correctly. There is no solution for such a problem at present.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

An object of the embodiments of the present invention is to provide a power compensation method, base station and terminal equipment, wherein, by transmitting power compensation information to the terminal equipment, power is compensated when the terminal equipment decodes PDCCH or PDSCH data transmitted by a base station according to the compensation information, or power is compensated for received DM-RS channel estimation, thereby ensuring accuracy of channel estimation and correct demodulation of received data by the terminal equipment.

According to one aspect of the embodiments of the present invention, there is provided a power compensation method, including: expanding a UE-specific downlink control channel region to a downlink shared channel region, the expanded UE-specific downlink control channel region being configured in a first time slot of one or more resource block pairs; and transmitting, by a base station, when the expanded UE-specific downlink control channel is amplitude phase keying modulated, a first ratio of the EPRE of the expanded UE-specific downlink control channel to the EPRE of a demodulation reference signal in the first time slot occupied by the expanded UE-specific downlink control channel, the first ratio being provided to a terminal for power compensation when decoding the received downlink control channel data transmitted by the base station.

According to another aspect of the embodiments of the present invention, there is provided a power compensation method, including: expanding a UE-specific downlink control channel region to a downlink shared channel region, the expanded UE-specific downlink control channel region and the downlink shared channel region multiplexing one or more resource block pairs, and being configured respectively in the regions of a first time slot and a second time slot of the resource block pairs; and transmitting, by a base station, when the power of a demodulation reference signal in the first time slot occupied by the expanded UE-specific downlink control channel is different from the power of a demodulation reference signal in the second time slot occupied by the downlink shared channel, a second ratio of the EPRE of the demodulation reference signal in the first time slot occupied by the expanded UE-specific downlink control channel to the EPRE of the demodulation reference signal in the second time slot, the second ratio being provided to a terminal for power compensation when performing channel estimation to the received demodulation reference signal.

According to still another aspect of the embodiments of the present invention, there is provided a power compensation method, including: expanding a UE-specific downlink control channel region to a downlink shared channel region, the expanded UE-specific downlink control channel region being configured in a first time slot of one or more resource block pairs;

transmitting, by a base station, when the expanded UE-specific downlink control channel is amplitude phase keying modulated, a third ratio of the EPRE of the expanded UE-specific downlink control channel to the EPRE of a demodulation reference signal in the first time slot occupied by the expanded UE-specific downlink control channel, the third ratio being provided to a terminal for power compensation when decoding the received downlink control channel data transmitted by the base station; and transmitting, by the base station, when the downlink shared channel region is configured in a region of a second time slot of the one or more resource block pairs and the power of the demodulation reference signal in the first time slot occupied by the expanded UE-specific downlink control channel is different from the power of a demodulation reference signal in the second time slot occupied by the downlink shared channel, a fourth ratio of the EPRE of a demodulation reference signal in the first time slot occupied by the expanded UE-specific downlink control channel to the EPRE of a demodulation reference signal in the second time slot, the fourth ratio being provided to a terminal for power compensation when performing channel estimation to the received demodulation reference signal.

According to a further aspect of the embodiments of the present invention, there is provided a power compensation method, including: expanding a UE-specific downlink control channel region to a downlink shared channel region, the expanded UE-specific downlink control channel region being configured in a region of a first time slot of one or more resource block pairs, and part or whole of the downlink shared channel region being configured in a region of a second time slot of the one or more resource block pairs, or being configured in resource block pairs different from the one or more resource block pairs;

configuring a power compensation value by a base station; and transmitting by the base station the power compensation value, the power compensation value being provided to a terminal for power compensation when decoding the received downlink control channel data or downlink shared channel data transmitted by the base station, or when performing channel estimation to the received demodulation reference signal.

According to still another aspect of the embodiments of the present invention, there is provided a power compensation method, including:

receiving, by a terminal, a fifth ratio transmitted by a base station, of the EPRE of an expanded UE-specific downlink control channel to the EPRE of a demodulation reference signal in a first time slot occupied by the UE-specific downlink control channel, or a sixth ratio transmitted by the base station, of the EPRE of the demodulation reference signal in the first time slot occupied by the expanded UE-specific downlink control channel to the EPRE of a demodulation reference signal in a second time slot, or a power compensation value transmitted by the base station; and performing power compensation by the terminal, by using the fifth ratio, the sixth ratio, or the power compensation value, when decoding the downlink control channel data or downlink shared channel data received from the base station, or when performing channel estimation to the received demodulation reference signal.

According to still another aspect of the embodiments of the present invention, there is provided a base station, including:

a first resource configurator, configured to expand a UE-specific downlink control channel region to a downlink shared channel region, the expanded UE-specific downlink control channel region being configured in a first time slot of one or more resource block pairs;

a first judger, configured to judge whether the modulation mode of the expanded UE-specific downlink control channel is amplitude phase keying; and a first compensation information transmitter, configured to transmit to a terminal, when the judging result of the first judger is that the expanded UE-specific downlink control channel is amplitude phase keying modulated, a first ratio of the EPRE of the expanded UE-specific downlink control channel to the EPRE of a demodulation reference signal in the first time slot occupied by the expanded UE-specific downlink control channel, the first ratio being provided to the terminal for power compensation when decoding the received downlink control channel data transmitted by the base station.

According to still another aspect of the embodiments of the present invention, there is provided a base station, comprising:

a second resource configurator, configured to expand a UE-specific downlink control channel region to a downlink shared channel region, the expanded UE-specific downlink control channel region and the downlink shared channel region multiplexing one or more resource block pairs, and being configured respectively in the regions of a first time slot and a second time slot of the resource block pairs;

a second judger, configured to judge whether the power of a demodulation reference signal in the first time slot occupied by the expanded UE-specific downlink control channel is identical to the power of a demodulation reference signal in the second time slot occupied by the downlink shared channel; and a second compensation information transmitter, configured to transmit to a terminal, when the judging result of the second judger is that the power of the demodulation reference signal in the first time slot occupied by the expanded UE-specific downlink control channel is different from the power of the demodulation reference signal in the second time slot occupied by the downlink shared channel, a second ratio of the EPRE of the demodulation reference signal in the first time slot occupied by the expanded UE-specific downlink control channel to the EPRE of the demodulation reference signal in the second time slot, the second ratio being provided to the terminal for power compensation when performing channel estimation to the received demodulation reference signal.

According to still another aspect of the embodiments of the present invention, there is provided a base station, including:

a third resource configurator, configured to expand a UE-specific downlink control channel region to a downlink shared channel region, the expanded UE-specific downlink control channel region being configured in a first time slot of one or more resource block pairs;

a third judger, configured to judge whether the modulation mode of the expanded UE-specific downlink control channel is amplitude phase keying;

a third compensation information transmitter, configured to transmit to a terminal, when the judging result of the third judger is that the expanded UE-specific downlink control channel is amplitude phase keying modulated, a third ratio of the EPRE of the expanded UE-specific downlink control channel to the EPRE of a demodulation reference signal in the first time slot occupied by the expanded UE-specific downlink control channel, the third ratio being provided to the terminal for power compensation when decoding the received downlink control channel data transmitted by the base station;

a fourth judger, configured to judge whether the downlink shared channel is configured in a region of a second time slot of the one or more resource block pairs or in resource block pairs different from the one or more resource block pairs, and whether the power of the demodulation reference signal in the first time slot occupied by the expanded UE-specific downlink control channel is identical to the power of a demodulation reference signal in the second time slot occupied by the downlink shared channel; and a fourth compensation information transmitter, configured to transmit to a terminal, when the judging result of the fourth judger is that the downlink shared channel is configured in a region of the second time slot of the one or more resource block pairs and the power of the demodulation reference signal in the first time slot occupied by the expanded UE-specific downlink control channel is different from the power of the demodulation reference signal in the second time slot occupied by the downlink shared channel, a fourth ratio of the EPRE of the demodulation reference signal in the first time slot occupied by the expanded UE-specific downlink control channel to the EPRE of the demodulation reference signal in the second time slot, the fourth ratio being provided to the terminal for power compensation when performing channel estimation to the received demodulation reference signal.

According to still another aspect of the embodiments of the present invention, there is provided a base station, comprising:

a fourth resource configurator, configured to expand a UE-specific downlink control channel region to a downlink shared channel region, the expanded UE-specific downlink control channel region being configured in a region of a first time slot of one or more resource block pairs, and part or whole of the downlink shared channel region being configured in a region of a second time slot of the one or more resource block pairs, or being configured in resource block pairs different from the one or more resource block pairs;

a compensation information configurator, configured to configure a power compensation value, the power compensation value being provided to a terminal for power compensation when decoding the received data transmitted by the base station, or when performing channel estimation to the received demodulation reference signal; and a seventh compensation information transmitter, configured to transmit the power compensation value to the terminal.

According to still another aspect of the embodiments of the present invention, there is provided a terminal, comprising:

a compensation information receiver, configured to receive, a fifth ratio transmitted by a base station, of the EPRE of an expanded UE-specific downlink control channel to the EPRE of a demodulation reference signal in a first time slot occupied by the expanded UE-specific downlink control channel, or receive a sixth ratio transmitted by the base station, of the EPRE of the demodulation reference signal in the first time slot occupied by the expanded UE-specific downlink control channel to the EPRE of a demodulation reference signal in the second time slot, or receive a power compensation value transmitted by the base station; and a power compensator, configured to perform power compensation, by using the received fifth ratio, the sixth ratio, or the power compensation value, when decoding the received downlink control channel data or downlink shared channel data transmitted by the base station, or when performing channel estimation to the received demodulation reference signal.

According to still another aspect of the embodiments of the present invention, there is provided a computer-readable program, wherein when the program is executed in a base station, the program enables a computer to carry out the power compensation method as described above in the base station.

According to still another aspect of the embodiments of the present invention, there is provided a storage medium in which a computer-readable program is stored, wherein the computer-readable program enables a computer to carry out the power compensation method as described above in a base station.

According to still another aspect of the embodiments of the present invention, there is provided a computer-readable program, wherein when the program is executed in a terminal, the program enables a computer to carry out the power compensation method as described above in the terminal.

According to still another aspect of the embodiments of the present invention, there is provided a storage medium in which a computer-readable program is stored, wherein the computer-readable program enables a computer to carry out the power compensation method as described above in a terminal.

The advantages of the embodiments of the present invention reside in that in case of expanding a transmission region of the PDCCH to a PDSCH region, the base station transmits a first ratio of the EPRE of an expanded UE-specific downlink control channel to the EPRE of a demodulation reference signal in a first time slot occupied by the expanded UE-specific downlink control channel when the expanded UE-specific downlink control channel is amplitude phase keying modulated, or the base station transmits a second ratio of the EPRE of a demodulation reference signal in the first time slot occupied by the expanded UE-specific downlink control channel to the EPRE of a demodulation reference signal in a second time slot when the power of a demodulation reference signal in the first time slot occupied by the expanded UE-specific downlink control channel is different from the power of the demodulation reference signal in the second time slot occupied by the downlink shared channel, so that power is compensated when the terminal equipment decodes the received PDCCH or PDSCH data transmitted by the base station according to said ratios, or power is compensated for the received DM-RS channel estimation, thereby ensuring accuracy of channel estimation and correct demodulation of received data by the terminal equipment.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The above and other objects, features and advantages of the embodiments of the present invention will become more obvious from the following detailed description with reference to the accompanying drawings. In the drawings.

DETAILED DESCRIPTION OF THE INVENTION

Various embodiments of the present invention shall be described below with reference to the drawings. These embodiments are illustrative only, and are not intended to limit the present invention. For easy understanding of the principle and embodiments of the present invention by those skilled in the art, the embodiments of the present invention shall be described taking an LTE-A system as an example. However, it should be understood that the present invention is not limited to said system, and is applicable to any other system relating to power compensation.

Figure 1A:
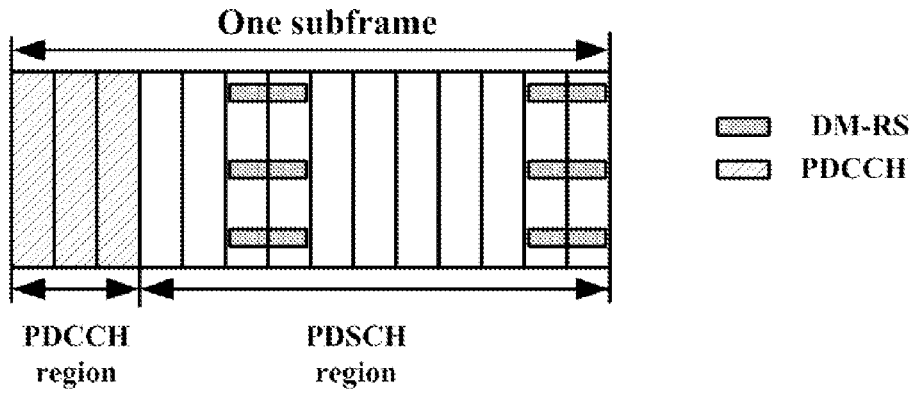
FIG. 1A is a schematic diagram of region configuration of PDCCH/PDSCH of an LTE system.

FIG. 1A is a schematic diagram of region of PDCCH/PDSCH of an LTE system. As shown in FIG. 1A, in Rel-8, the first to N-th OFDM symbols are possible transmission regions of PDCCH; as shown in Table 1, N=1, 2, 3 or 4 are configured via a high layer, for example, as shown in FIG. 1A, N=3. Transmission regions of PDSCH are started from the (N+1)-th OFDM symbol. Wherein, Table 1 shows a number of OFDM symbols used by a PDCCH.

In order to improve performance of a cell-edge user and the capacity of a cell, in an LTE-A system, a transmission region of PDCCH is expanded from previous N OFDM symbols to a PDSCH region starting from the (N+1)-th OFDM symbol.

Figure 1B:
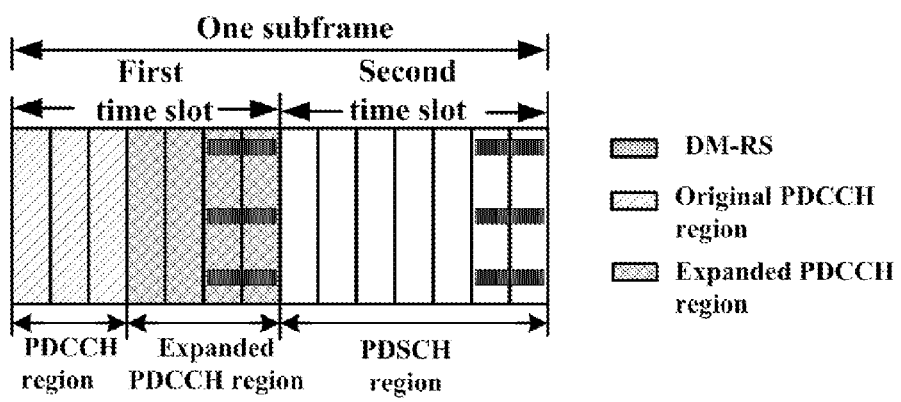
FIG. 1B is a schematic diagram of region configuration of PDCCH/PDSCH of an LTE system of an embodiment of the present invention.

FIG. 1B is a schematic diagram of transmission region of PDCCH/PDSCH of an embodiment of the present invention. As shown in FIG. 1B, a transmission region of UE-specific PDCCH is expanded from previous N OFDM symbols in Rel-8 to a transmission region of PDSCH, the PDCCH expanded to the transmission region of PDSCH being referred to as an expanded PDCCH region. For example, as shown in FIG. 1B, the transmission region of PDCCH is expanded from previous N OFDM symbols to occupying former 7 OFDM symbols. However, this is just an embodiment of the present invention, and it may be expanded to the transmission region of PDSCH as actually required.

TABLE 1

| Subframe | Number of OFDM symbols when $N_{RB}^{DL} > 10$ | Number of OFDM symbols when $N_{RB}^{DL} < 10$ |
|---|---|---|
| Subframes 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

Figure 2A:
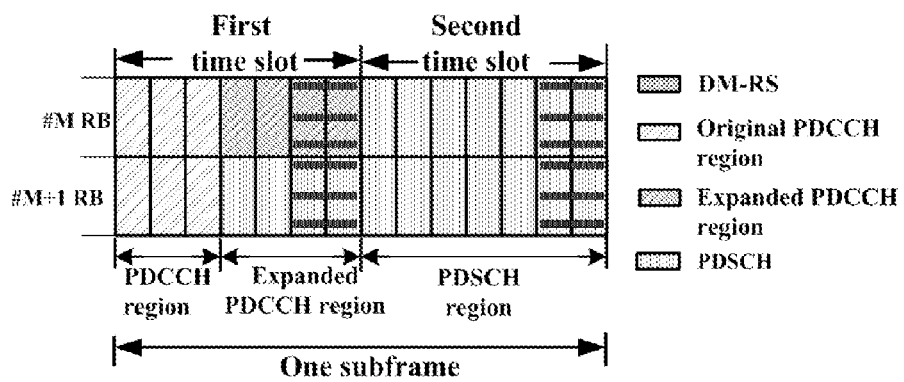
FIG. 2A is a schematic diagram of identical resource block (RB) pairs occupied by transmission regions of PDCCH and PDSCH of an embodiment of the present invention.

In this embodiment, the expanded transmission region of PDCCH and the transmission region of PDSCH may multiplex one or more RB pairs, and are respectively configured in the regions of a first time slot and a second time slot of the one or more RB pairs. Furthermore, the expanded transmission region of PDCCH and the transmission region of PDSCH may be respectively configured in different RB pairs. For example, all the transmission regions of PDSCH may be configured in RB pairs different from those where the transmission regions of the PDCCH are located, or part of the transmission regions of PDSCH are configured in RB pairs different from those where the transmission regions of the PDCCH are located, and the other part transmission regions are configured in RB pairs identical to those where the transmission regions of the PDCCH are located. FIG. 2A is a schematic diagram of identical RB pairs occupied by transmission regions of PDCCH and PDSCH of an embodiment of the present invention. As shown in FIG. 2A, an expanded transmission region of PDCCH occupies an M-th resource block and a first time slot of an RB pair, and a transmission region of PDSCH occupies the M-th resource block and a second time slot.

Figure 2B:
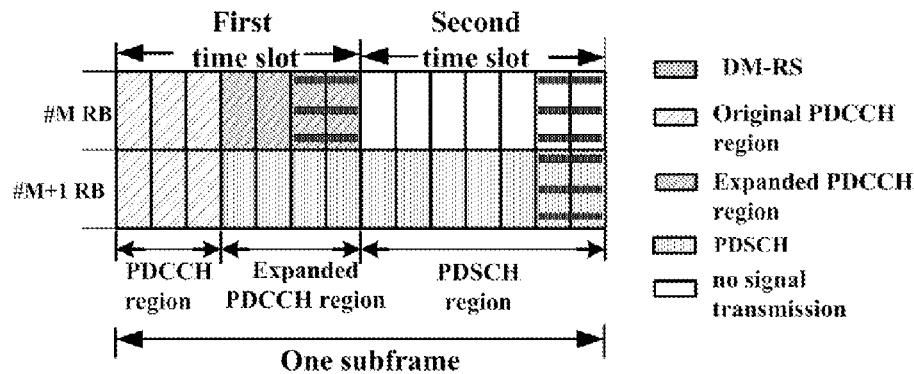
FIG. 2B is a schematic diagram of different resource block (RB) pairs occupied by transmission regions of PDCCH and PDSCH of an embodiment of the present invention.

FIG. 2B is a schematic diagram of different RB pairs occupied by transmission regions of PDCCH and PDSCH of an embodiment of the present invention. As shown in FIG. 2B, an expanded transmission region of PDCCH occupies an M-th resource block and a first time slot, and a transmission region of PDSCH occupies the (M+1)-th resource block and first and second time slots.

FIGS. 2A and 2B show only examples of the identical and different RB pairs occupied by an expanded transmission region of PDCCH and a transmission region of PDSCH. However, it is not limited to the above examples, and there may be cases where multiple RB pairs are occupied. For simply explaining the embodiments of the present invention, FIGS. 2A and 2B are taken as examples for explanation.

The embodiments of the present invention shall be described below with reference to the accompanying drawings. In the embodiments of the present invention, in order to increase the cell capacity and ensure that the terminal equipment correctly demodulates the received data transmitted by the base station, the base station side needs to provide related power compensation information to the terminal equipment.

Embodiment 1

Figure 3:
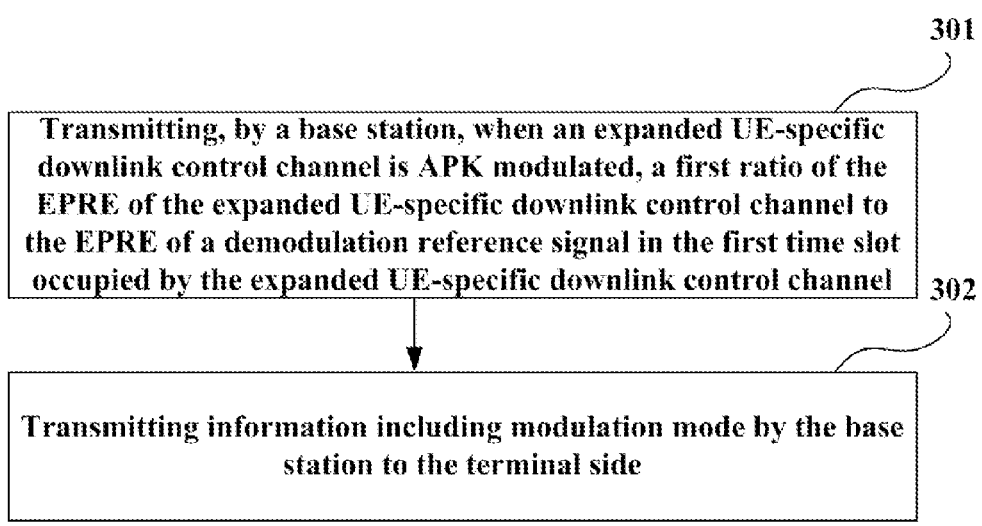
FIG. 3 is a flowchart of the power compensation method of Embodiment 1 of the present invention.

FIG. 3 is a flowchart of the power compensation method of Embodiment 1 of the present invention. As shown in FIG. 3, the method includes: transmitting, by a base station, when an expanded UE-specific physical downlink control channel (UE-specific PDCCH) is amplitude phase keying (APK) modulated, a first ratio of the EPRE of the expanded UE-specific PDCCH to the EPRE of a demodulation reference signal (DM-RS) in a first time slot occupied by the expanded UE-specific PDCCH, the first ratio being provided to a terminal for power compensation when decoding the received PDCCH transmitted by the base station (see step 301).

In this embodiment, the above embodiment is applicable to a case where the PDCCH and a scheduled PDSCH occupy one RB pair, and is also applicable to a case where different RB pairs are occupied. For example, it is applicable to both cases shown in FIGS. 2A and 2B. Furthermore, the above embodiment is applicable to a case where part of transmission regions of PDSCH and transmission regions of PDCCH occupy one or more identical RB blocks, and the other part of the transmission regions occupy different RB pairs.

In this embodiment, EPRE (energy per resource element) refers to transmission energy of each resource element. Wherein, the first ratio may be for example denoted by $P_1$, which may be expressed by formula $$P_1 = \frac{P(PDCCH)}{P_1(DM-RS)};$$

where, P(PDCCH) denotes EPRE of an expanded UE-specific PDCCH, and $P_1$(DM-RS) denotes EPRE of a DM-RS in a first time slot occupied by the expanded UE-specific PDCCH.

In this embodiment, the first ratio $P_1$ may be transmitted via high-layer signaling, such as radio resource control (RRC) signaling.

Furthermore, the base station may transmit information of the modulation mode used by the expanded PDCCH to the terminal (see step 302); wherein, the information of modulation mode may be contained in the high-layer signaling and transmitted together with the first ratio $P_1$. However, step 302 is optional.

In this embodiment, the base station further transmits a PDCCH data signal and a DM-RS pilot signal to the terminal equipment, so that the terminal equipment compensates for the power in using the above first ratio $P_1$ to decode received detected data, thereby ensuring that the terminal equipment correctly demodulate the received data.

It can be seen from the above embodiment that when the expanded UE-specific PDCCH is APK modulated, the base station needs to transmit the first ratio of the EPRE of the expanded UE-specific downlink control channel to the EPRE of a demodulation reference signal in the time slot occupied by the expanded UE-specific PDCCH, so that power is compensated when the terminal equipment decodes received PDCCH transmitted by the base station according to the first ratio, thereby ensuring correct demodulation of received data by the terminal equipment.

Embodiment 2

An embodiment of the present invention further provides a power compensation method, including: transmitting, by a base station, when the power of a demodulation reference signal (DM-RS) in a first time slot occupied by an expanded UE-specific PDCCH is different from the power of a demodulation reference signal (DM-RS) in a second time slot occupied by a PDSCH, a second ratio of the EPRE of the demodulation reference signal (DM-RS) in the first time slot occupied by the expanded UE-specific PDCCH to the EPRE of a demodulation reference signal (DM-RS) in the second time slot;

the second ratio being provided to a terminal for power compensation when performing channel estimation to the received DM-RS.

In this embodiment, the above embodiment is applicable to a case where the PDCCH and a scheduled PDSCH occupy the same one or more RB pairs. For example, it may be applicable to the case shown in FIG. 2A.

In this embodiment, EPRE (energy per resource element) refers to transmission energy of each resource element. Wherein, the second ratio may be for example denoted by $P_2$, which may be expressed by formula $$P_2 = \frac{P_1(DM-RS)}{P_2(DM-RS)};$$

where, $P_1$(DM-RS) denotes EPRE of a DM-RS of a first time slot occupied by the expanded UE-specific PDCCH, and $P_2$(DM-RS) denotes EPRE of a DM-RS of a region of a second time slot in the same RB pair as the expanded UE-specific PDCCH.

In this embodiment, the base station further transmits a PDSCH data signal and a pilot signal to the terminal equipment, so that the terminal equipment compensates for the power in using the above second ratio $P_2$ to perform channel estimation to the received DM-RS, thereby ensuring the accuracy of channel estimation by the terminal equipment.

It can be seen from the above embodiment that when the power of the DM-RS in the first time slot occupied by the expanded UE-specific PDCCH is different from the power of the DM-RS in the second time slot occupied by the PDSCH, the base station transmits a second ratio of the EPRE of the DM-RS in the first time slot occupied by the expanded UE-specific PDCCH to the EPRE of the DM-RS in the second time slot, so that power is compensated when the terminal equipment performs channel estimation to the received DM-RS according to the second ratio, thereby ensuring the accuracy of channel estimation by the terminal equipment.

Embodiment 3

In above embodiments 1 and 2, the power compensation methods are respectively described in which the expanded UE-specific PDCCH is APK modulated and the power of the DM-RS in the first time slot occupied by the expanded UE-specific PDCCH is different from the power of the DM-RS in the second time slot occupied by the PDSCH. In this embodiment, an example of use combining the above methods shall be described.

Figure 4:
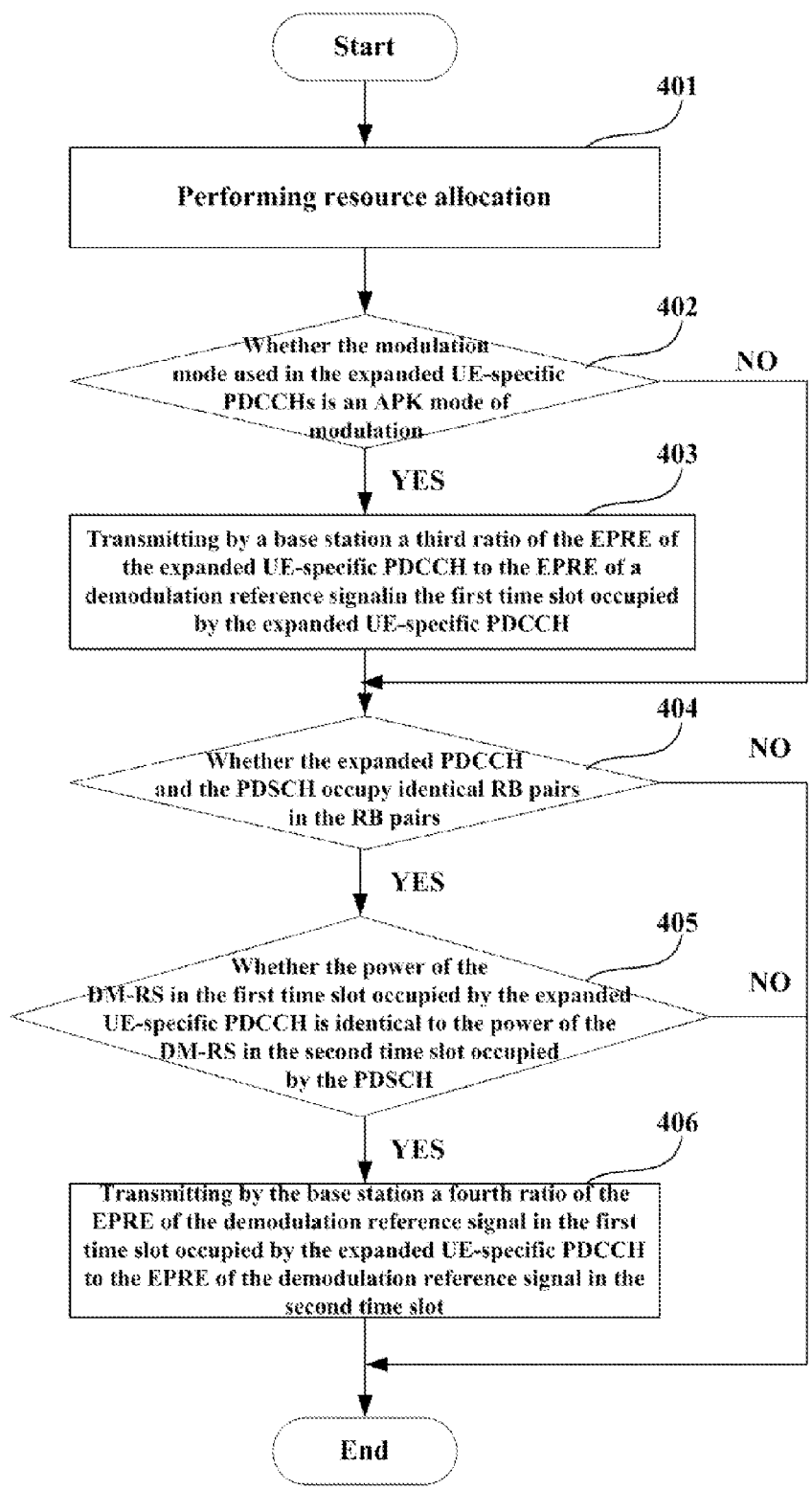
FIG. 4 is a flowchart of the power compensation method of Embodiment 3 of the present invention.

FIG. 4 is a flowchart of the power compensation method of Embodiment 3 of the present invention. As shown in FIG. 4, the method includes:

step 401: performing resource allocation;

In this embodiment, a transmission region of PDCCH is expanded to a region of PDSCH.

For example, as shown in FIGS. 2A and 2B, the expanded transmission region of PDCCH and the transmission region of PDSCH may occupy the same RB pair, and may also occupy different RB pairs. As shown in FIG. 2B, when the PDCCH and the PDSCH occupy different RB pairs, a PDSCH does not being transmitted in the second time slot of the RB pair occupied by the PDCCH.

step 402: judging whether the modulation mode used in the expanded UE-specific PDCCH is an APK modulation mode, and executing step 403 if the result of judgment is positive; otherwise, executing step 404;

step 403: transmitting by a base station a third ratio of the EPRE of the expanded UE-specific PDCCH to the EPRE of a demodulation reference signal (DM-RS) in the first time slot occupied by the expanded UE-specific PDCCH;

wherein, the third ratio is provided to a terminal for power compensation when decoding the received PDCCH transmitted by the base station;

In this embodiment, the base station may transmit the third ratio to the terminal side via high-layer signaling, and transmit modulation mode in the high-layer signaling while transmitting the third ratio.

step 404: further judging whether the expanded PDCCH and the PDSCH occupy identical RB pairs;

In this embodiment, for example, if the case shown in FIG. 2A where the same RB pair is occupied is configured, step 405 is executed, and if the case shown in FIG. 2B where different RB pairs are occupied is configured, the process is terminated.

step 405: further judging whether the power of the demodulation reference signal (DM-RS) in the first time slot occupied by the expanded UE-specific PDCCH is identical to the power of a demodulation reference signal (DM-RS) in the second time slot occupied by the PDSCH, and executing step 406 if the result of judgment is negative; otherwise, terminating the process; and step 406: transmitting by the base station a fourth ratio of the EPRE of the demodulation reference signal (DM-RS) in the first time slot occupied by the expanded UE-specific PDCCH to the EPRE of the demodulation reference signal (DM-RS) in the second time slot in the same RB pair;

wherein, the fourth ratio is provided to a terminal for power compensation when performing channel estimation to the received DM-RS transmitted by the base station.

In the above embodiment, the modulation mode used by the expanded PDCCH is judged first, and then judging whether the power of the DM-RS in the first time slot occupied by the expanded UE-specific PDCCH is identical to the power of the DM-RS in the second time slot occupied by the PDSCH. However, it is an embodiment of the present invention only, and is not limited to the above order of judgment. For example, steps 404 and 405 may be executed first, and then step 402 is executed. Generally, the object is to transmit the third ratio and the fourth ratio by the base station to the terminal no matter which of the orders is used, so that power is compensated when the terminal decodes the received PDCCH data and PDSCH data, or power is compensated for the received DM-RS channel estimation, according to the third ratio and the fourth ratio, thereby ensuring the accuracy of channel estimation by the terminal equipment and correct demodulation of the received data by the terminal equipment.

Embodiment 4

Figure 5:
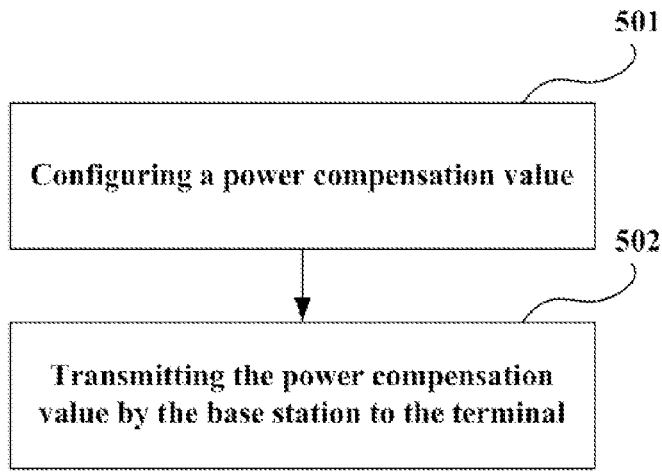
FIG. 5 is a flowchart of the power compensation method of Embodiment 4 of the present invention.

FIG. 5 is a flowchart of the power compensation method of Embodiment 4 of the present invention. As shown in FIG. 5, the method includes:

step 501: configuring a power compensation value by a base station, the power compensation value being provided to a terminal for power compensation when decoding the received PDCCH data or PDSCH data transmitted by the base station, or when performing channel estimation to the received DM-RS;

In this embodiment, the power compensation value may be denoted by $\Delta P$, which may be determined according to such factors as a channel state, inter-cell interference, and a difference between ranks of a PDCCH and a PDSCH in the same RB pair, etc. For example, the power compensation value may be $$\Delta P = 10 \times \log_{10}(M/N) \text{ dB};$$

where M denotes a rank of a precoding matrix to which a PDSCH corresponds, and N denotes a rank of a precoding matrix to which a PDCCH corresponds.

step 502: transmitting the power compensation value by the base station to the terminal;

In this embodiment, the base station may transmit the power compensation value to the terminal via high-layer signaling.

The above embodiment is applicable to any case where a PDCCH region is expanded to a PDSCH region, such as the cases shown in FIGS. 2A and 2B.

It can be seen from the above embodiment that the base station may configure the power compensation value as actually required, so that power is compensated when the terminal decodes the received PDCCH or PDSCH data transmitted by the base station, or power is compensated for the received DM-RS channel estimation, according to the power compensation value, thereby ensuring the accuracy of channel estimation by the terminal equipment and correct demodulation of the received data by the terminal equipment, with the manner being simple in realization.

The configuration of transmission regions in embodiments 1-4 are described taking the cases shown in FIGS. 2A and 2B as examples. However, it is also applicable to other cases where part of transmission regions of PDSCH and expanded transmission regions of PDCCH occupy one or more identical RB pairs, and the other part of the transmission regions occupy different RB pairs, with the principles of power compensation being similar, which shall not be described herein any further.

In the above embodiments 1-4, the base station may transmit the first to fourth ratios or the power compensation value to the terminal via high-layer signaling; however, it is not limited thereto. Furthermore, the base station transmits data signals and pilot signals (DM-RSs) to the terminal equipment, so that power is compensated when the terminal equipment decodes the received data, or power is compensated for the received DM-RS channel estimation, according to the said ratios or the power compensation value, thereby ensuring the accuracy of channel estimation by the terminal equipment and correct demodulation of the received data by the terminal equipment.

Embodiment 5

Figure 6:
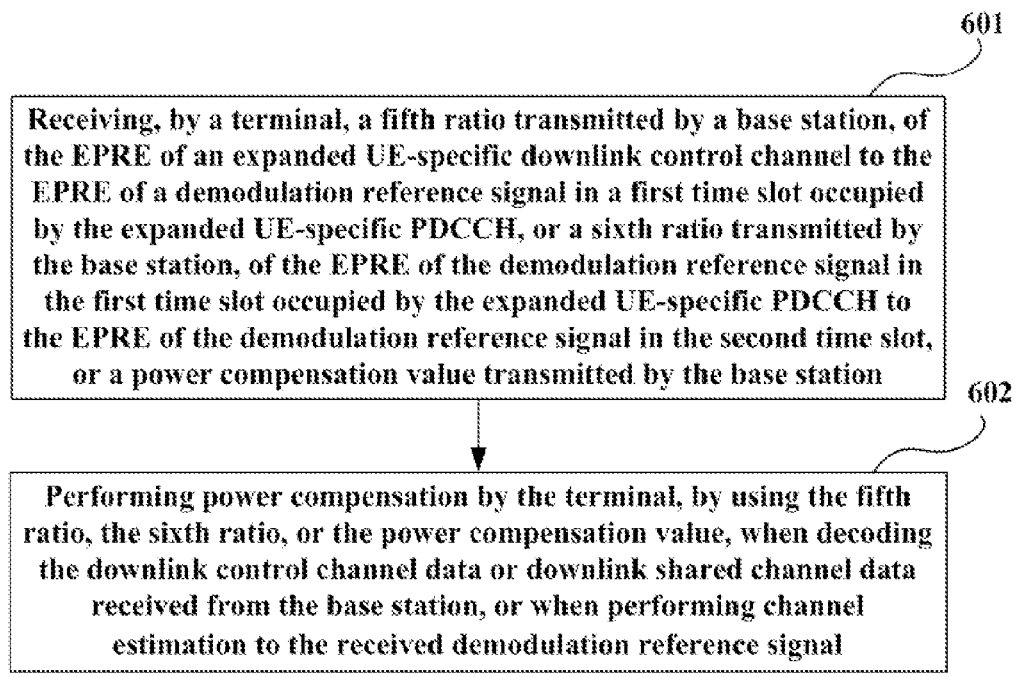
FIG. 6 is a flowchart of the power compensation method of Embodiment 5 of the present invention.

FIG. 6 is a flowchart of the power compensation method of Embodiment 5 of the present invention. As shown in FIG. 6, the method includes:

step 601: receiving, by a terminal, a fifth ratio transmitted by a base station, of the EPRE of an expanded UE-specific PDCCH to the EPRE of a DM-RS in a first time slot occupied by the UE-specific PDCCH, or a sixth ratio transmitted by the base station, of the EPRE of the DM-RS in the first time slot occupied by the expanded UE-specific PDCCH to the EPRE of a DM-RS in a second time slot, or a power compensation value transmitted by the base station; and step 602: performing power compensation by the terminal, by using the fifth ratio, the sixth ratio, or the power compensation value, when decoding the downlink control channel data or downlink shared channel data received from the base station, or when performing channel estimation to the received demodulation reference signal.

Wherein, the fifth ratio corresponds to the first ratio or the third ratio in Embodiment 1 or 3, and the sixth ratio corresponds to the second ratio or the fourth ratio in Embodiment 2 or 3.

In this embodiment, the base station further transmit PDCCH or PDSCH data signals and DM-RSs (pilot signals) to the terminal equipment, and the terminal equipment receives these data signals and pilot signals.

Wherein, in receiving the pilot signals and the data signals transmitted by the base station, the terminal equipment may perform channel estimation based on the pilot signals, perform data detection based on the result of channel estimation, and compensate for the power of the detected data by using the fifth ratio, or the sixth ratio, or the power compensation value.

The method of power compensation by the terminal equipment when using the ratios or power compensation value above to decode the received data shall be described below in detail. For example, the base station transmit a data signal d and a pilot signal p, and the signals received by the terminal equipment after passing through a wireless attenuation channel are:

$$y_1 = H(\beta_1 d) + n,$$

$$y_2 = H(\beta_2 p) + n;$$

where, $y_1$ is a data signal received by the terminal equipment, d is a modulation symbol of variance of 1, $\beta_1$ is power of data transmitted by the base station, H is a wireless attenuation channel, n is a noise; and $y_2$ is a pilot signal received by the terminal equipment, p is a pilot symbol of variance of 1, and $\beta_2$ is power of a pilot transmitted by the base station.

The terminal equipment obtains an estimated value $\hat{H}$ of the wireless attenuation channel H by channel estimation, $$\hat{H} = y_2/p = H\beta_2 + n/p;$$

the terminal equipment performs data detection based on $\hat{H}$ obtained through channel estimation, and if the effect of the noise is neglected, the data d obtained through estimated is expressed as $\hat{d} = y_1/\hat{H} = \beta_1/\beta_2 d$;

In order to eliminate the effects of different transmission power, it is needed to eliminate the effect of power in the obtained data $\hat{d}$ through estimated, that is, to perform power compensation, i.e. $\tilde{d} = \hat{d}\beta_2/\beta_1 = d$.

Hence, a value of $\beta_2/\beta_1$ is learnt at the terminal equipment, that is, an EPRE ratio of the pilot to the data is learnt, the EPRE ratio being the above first or third ratio, or the power compensation value configured by the base station, and the terminal equipment may perform power compensation to the detected data, so as to ensure correct demodulation of data.

Following detailed description is given by way of an example to the method of power compensation by the terminal equipment to the received DM-RS channel estimation by using the above ratios or the power compensation value.

For example, the base station transmits a data signal d and a pilot signal p (i.e. a DM-RS), and the signals received by the terminal equipment after passing through a wireless attenuation channel are:

$$y_2 = H(\beta_2 p) + n,$$

$$y_3 = H(\beta_3 p) + n;$$

where, $y_1$ is a data signal received by the terminal equipment, d is a modulation symbol of variance of 1, $\beta_1$ is power of data transmitted by the base station, H is a wireless attenuation channel, n is a noise; and $y_2$ is a pilot signal in the first time slot received by the terminal equipment, $y_3$ is a pilot signal in the second time slot received by the terminal equipment, p is a pilot symbol of variance of 1, $\beta_2$ is power of the base station for transmitting the pilot in the first time slot, and $\beta_3$ is power of the base station for transmitting the pilot in the second time slot.

The terminal equipment obtains an estimated value $\hat{H}_1$ of the wireless attenuation channel H of the first time slot and an estimated value $\hat{H}_2$ of the wireless attenuation channel H of the second time slot by channel estimation, which are expressed by formulae below:

$$\hat{H}_1 = y_2/p = H\beta_2 + n/p,$$

$$\hat{H}_2 = y_3/p = H\beta_3 + n/p;$$

when the time domain of the channel varies slowly, it is often assumed that the channels of the first time slot and the second time slot are identical, and a channel interpolation of the time domain is made based on such an assumption. In order obtain identical $\hat{H}_1$ and $\hat{H}_2$, it needs to eliminate the effect of power on the estimated channels, that is, $\hat{H}_1 = \tilde{H}_1 = \hat{H}_2 \beta_2/\beta_3$.

Hence, a value of $\beta_2/\beta_3$ is learnt at the terminal equipment, that is, a ratio of the power of the pilot in the first time slot to the power of the pilot in the second time slot, i.e. an EPRE ratio, is learnt, the EPRE ratio being the above second or fourth ratio, or the power compensation value configured by the base station, and the terminal equipment may perform power compensation to the DM-RS channel estimation, so as to ensure correct demodulation of data.

It can be seen from the above embodiment that the terminal equipment may perform power compensation in when decoding the received data or perform power compensation to the received DM-RS channel estimation by using the fifth ratio of the EPRE of the expanded UE-specific PDCCH to the EPRE of the DM-RS in the first time slot occupied by the expanded UE-specific PDCCH, or by using a received sixth ratio transmitted by the base station of the EPRE of the DM-RS in the first time slot occupied by the expanded UE-specific PDCCH to the EPRE of the DM-RS in the second time slot, or by using a received power compensation value transmitted by the base station, thereby ensuring the accuracy of channel estimation and correct demodulation of the received data.

An embodiment of the present invention further provides a base station and terminal equipment, as described in embodiments 6-10 below. As the principle of the base station and terminal equipment for solving problem is similar to that of the above-described power compensation method based on a base station and terminal equipment, the implementation of the method may be referred to for the implementation of the base station and terminal equipment, and the repeated parts shall not be described any further.

Embodiment 6

Figure 7:
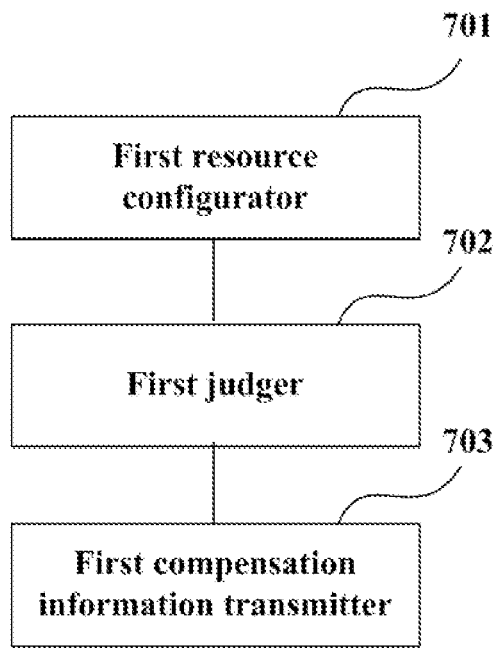
FIG. 7 is a schematic diagram of the structure of the base station of Embodiment 6 of the present invention.

FIG. 7 is a schematic diagram of the structure of the base station of Embodiment 6 of the present invention. As shown in FIG. 7, the base station includes a first resource configurator 701, a first judger 702 and a first compensation information transmitter 703; wherein, the first resource configurator 701 is configured to expand a UE-specific downlink control channel region to a downlink shared channel region, the expanded UE-specific PDCCH region being configured in a first time slot of one or more resource block pairs;

the first judger 702 is configured to judge whether the modulation mode of the expanded UE-specific downlink control channel is amplitude phase keying; and the first compensation information transmitter 703 is configured to transmit to a terminal, when the expanded UE-specific downlink control channel is amplitude phase keying modulated, a first ratio of the EPRE of the expanded UE-specific downlink control channel to the EPRE of a demodulation reference signal (DM-RS) in the first time slot occupied by the expanded UE-specific downlink control channel, the first ratio being provided to the terminal for power compensation when decoding the received PDCCH data transmitted by the base station.

Furthermore, the base station may comprise a modulation information transmitter (not shown) configured to transmit information including a modulation mode to the terminal Wherein, the first compensation information transmitter 703 may transmit the first ratio to the terminal equipment via high-layer signaling, and a modulation mode may be contained in the high-layer signaling at the same time for transmission. In this way, the modulation information transmitter may be carried out by the first compensation information transmitter 703.

In the above embodiment, part or all the regions of PDSCHs are configured in regions of the second time slot of one or more RB pairs, or the PDSCH regions are not configured in the one or more RB pairs.

Embodiment 7

Figure 8:
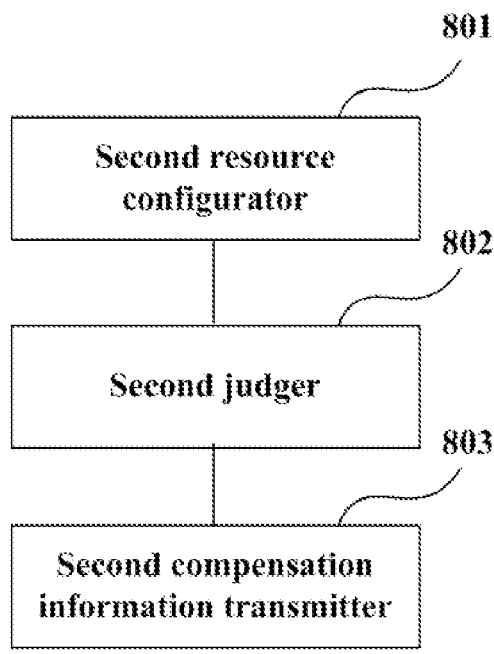
FIG. 8 is a schematic diagram of the structure of the base station of Embodiment 7 of the present invention.

FIG. 8 is a schematic diagram of the structure of the base station of Embodiment 7 of the present invention. As shown in FIG. 8, the base station includes a second resource configurator 801, a second judger 802 and a second compensation information transmitter 803; wherein, the second resource configurator 801 is configured to expand a UE-specific downlink control channel region to a downlink shared channel region, the expanded UE-specific downlink control channel region and the downlink shared channel region multiplexing one or more RB pairs, and being configured respectively in the regions of a first time slot and a second time slot of the RB pairs;

the second judger 802 is configured to judge whether the power of a DM-RS in the first time slot occupied by the expanded UE-specific downlink control channel is identical to the power of a demodulation reference signal (DM-RS) in the second time slot occupied by the downlink shared channel; and the second compensation information transmitter 803 is configured to transmit to a terminal, when the judging result of the second judger 802 is that the power of the demodulation reference signal in the first time slot occupied by the expanded UE-specific downlink control channel is different from the power of the demodulation reference signal in the second time slot occupied by the downlink shared channel, a second ratio of the EPRE of the demodulation reference signal in the first time slot occupied by the expanded UE-specific downlink control channel to the EPRE of the demodulation reference signal in the second time slot;

the second ratio being provided to the terminal for power compensation when performing channel estimation to the received demodulation reference signal.

Embodiment 8

Figure 9:
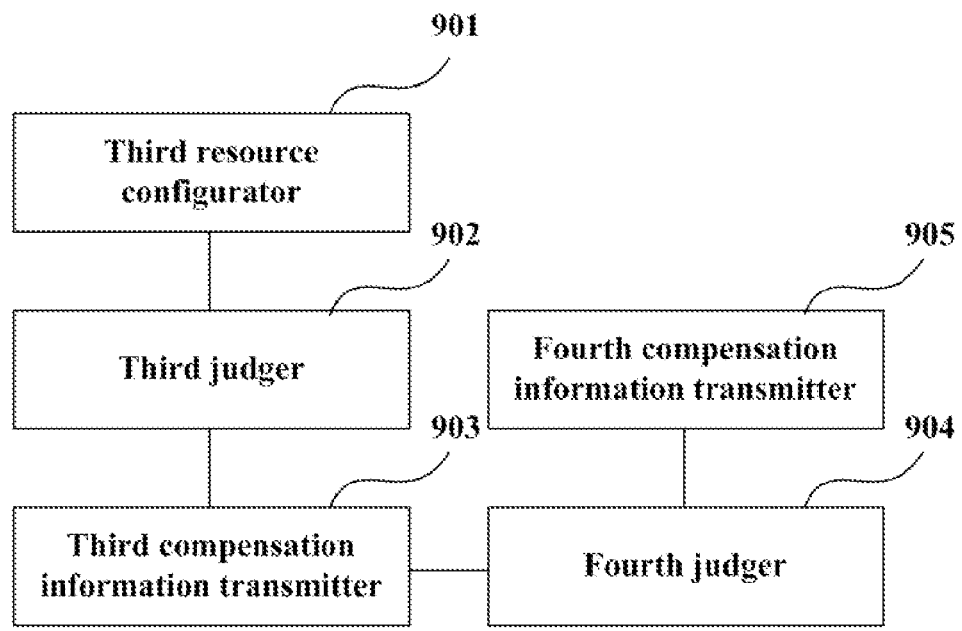
FIG. 9 is a schematic diagram of the structure of the base station of Embodiment 8 of the present invention.

Furthermore, in this embodiment, the base stations in embodiments 7 and 6 may be combined to realize power compensation. FIG. 9 is a schematic diagram of the structure of the base station of Embodiment 8 of the present invention.

Wherein, if the order of execution of Embodiment 3 shown in FIG. 4 is used, as shown in FIG. 9, the base station may include:

a third resource configurator 901 configured to expand a UE-specific downlink control channel region to a downlink shared channel region, the expanded UE-specific downlink control channel region being configured in a first time slot of one or more RB pairs;

a third judger 902 configured to judge whether the modulation mode of the expanded UE-specific downlink control channel is amplitude phase keying;

a third compensation information transmitter 903 configured to transmit to a terminal, when the judging result of the third judger 902 is that the expanded UE-specific downlink control channel is amplitude phase keying modulated, a third ratio of the EPRE of the expanded UE-specific downlink control channel to the EPRE of a demodulation reference signal in the first time slot occupied by the expanded UE-specific downlink control channel, the third ratio being provided to the terminal for power compensation when decoding the received downlink control channel data transmitted by the base station;

a fourth judger 904 configured to judge whether the downlink shared channel is configured in a region of a second time slot of the one or more RB pairs or in RB pairs different from the one or more RB pairs, and whether the power of the demodulation reference signal in the first time slot occupied by the expanded UE-specific downlink control channel is identical to the power of the demodulation reference signal in the second time slot occupied by the downlink shared channel; and a fourth compensation information transmitter 905 configured to transmit to a terminal, when the judging result of the fourth judger 904 is that the downlink shared channel is configured in a region of the second time slot of the one or more RB pairs and the power of the demodulation reference signal in the first time slot occupied by the expanded UE-specific downlink control channel is different from the power of the demodulation reference signal in the second time slot occupied by the downlink shared channel, a fourth ratio of the EPRE of the demodulation reference signal in the first time slot occupied by the expanded UE-specific downlink control channel to the EPRE of the demodulation reference signal in the second time slot;

the fourth ratio being provided to the terminal for power compensation when performing channel estimation to the received demodulation reference signal.

The base station shown in FIG. 9 is an embodiment of the present invention only, and the connection relationship between the components of the base station may be adjusted according to actual orders of execution.

Embodiment 9

Figure 10:
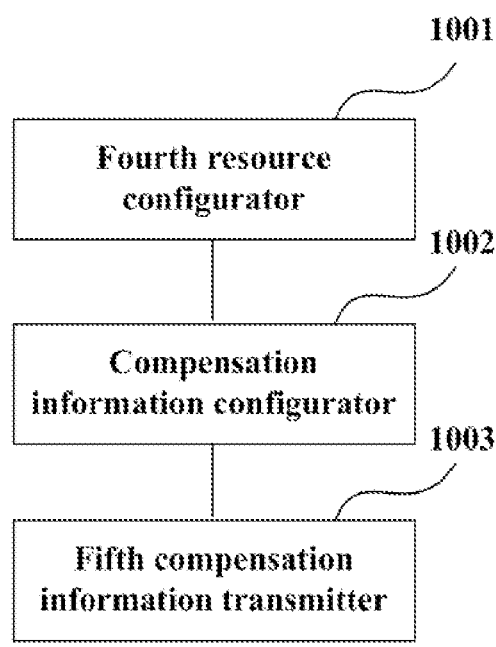
FIG. 10 is a schematic diagram of the structure of the base station of Embodiment 9 of the present invention.

FIG. 10 is a schematic diagram of the structure of the base station of Embodiment 9 of the present invention. As shown in FIG. 10, the base station includes a fourth resource configurator 1001, a compensation information configurator 1002 and a fifth compensation information transmitter 1003; wherein, the fourth resource configurator 1001 is configured to expand a UE-specific downlink control channel region to a downlink shared channel region, the expanded UE-specific downlink control channel region being configured in a region of a first time slot of one or more RB pairs, and part or whole of the downlink shared channel region being configured in a region of a second time slot of the one or more RB pairs, or being configured in RB pairs different from the one or more RB pairs;

the compensation information configurator 1002 is configured to configure a power compensation value, the power compensation value being provided to a terminal for power compensation when decoding the received data transmitted by the base station, or when performing channel estimation to the received DM-RS, and the fifth compensation information transmitter 1003 is configured to transmit the power compensation value to the terminal In the above embodiments 6-9, all the base stations may include a transmitter (not shown) configured to transmit a data signal and a pilot signal to the terminal equipment.

It can be seen from the above embodiment that the base station transmit to the terminal equipment the ratio of the EPRE of the expanded UE-specific downlink control channel to the EPRE of the DM-RS in the first time slot occupied by the expanded UE-specific downlink control channel, or the ratio of the EPRE of the DM-RS in the first time slot occupied by the expanded UE-specific downlink control channel to the EPRE of the DM-RS in the second time slot, or the power compensation value, so that the terminal equipment uses the above ratios or the power compensation value to perform power compensation in decoding the received data or to perform power compensation to the received DM-RS channel estimation, thereby ensuring the accuracy of channel estimation and correct demodulation of the received data.

Embodiment 10

Figure 11:
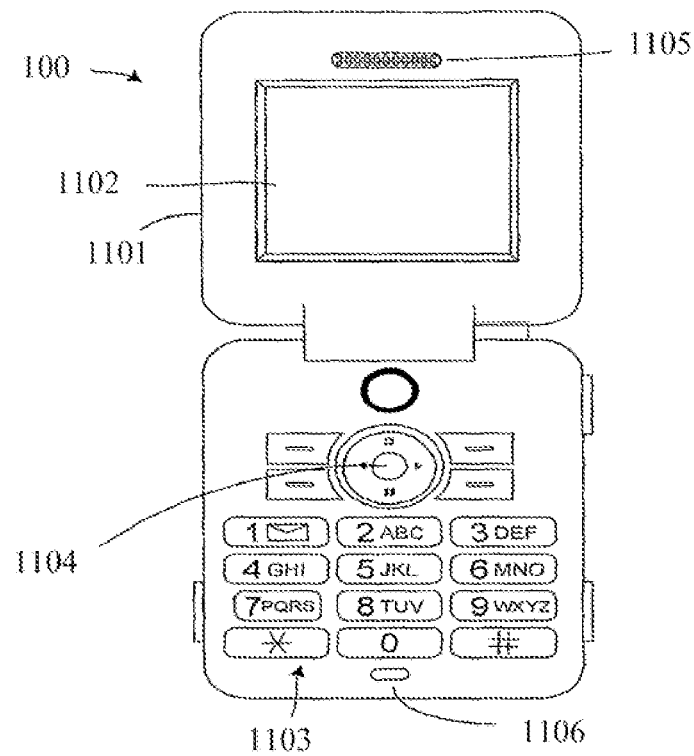
FIG. 11 is a schematic diagram of a mobile phone used as an example of terminal equipment.

FIG. 11 is a schematic diagram of a mobile phone used as an example of terminal equipment. Examples of the terminal equipment are not limited to a mobile phone. And the terminal equipment may also be any devices capable of communicating, such as a game player, a PDA, and a portable computer, etc.

As shown in FIG. 11, the mobile phone 100 may be a flip-lid phone having a flip lid 1101 movable between an open position and a closed position. In FIG. 11, the flip lid 1101 is shown as being in the open position. It should understood that the mobile phone 100 may also be of other structures, such as a "bar phone" or a "slide-lip phone" structure.

The mobile phone 100 may comprise a display 1102. The display 1102 displays such information to a user as an operational state, time, phone number, telephone directory information, and various menus, etc., so that the user is enabled to use various characteristics of the mobile phone 100. The display 1102 may also be used to visibly display contents received by the mobile phone 100 and/or retrieved from a memory (not shown) of the mobile phone 100. The display 1102 may be used to display images, videos and other graphics to a user, such as photos, mobile TV contents and videos related to games, etc.

A keyboard 1103 provides multiple user input operations. For example, the keyboard 1103 may comprise an alphanumeric key permitting input of alphanumeric information (such as a phone number, a phone list, telephone directory information, a notebook, and a text, etc.). Furthermore, the keyboard 1103 may comprise specific functional keys 1104, such as a "call transmit" key to initiate a call or respond a call, and a "call end" key to end or "hang up" a call. The specific functional keys may further comprise a menu navigation key and a selection key on the menu of the display 1102 for convenient navigation. For example, a pointing device and/or a navigation key may be provided to receive directional input from a user. Furthermore, the display 1102 and the keyboard 1103 may be combined in use for carrying out a function of a soft key. The mobile phone 100 may further comprise parts necessary for carrying out its functions, such as an antenna, a microcontroller, a loudspeaker 1105, and a microphone 1106, etc.

Figure 12:
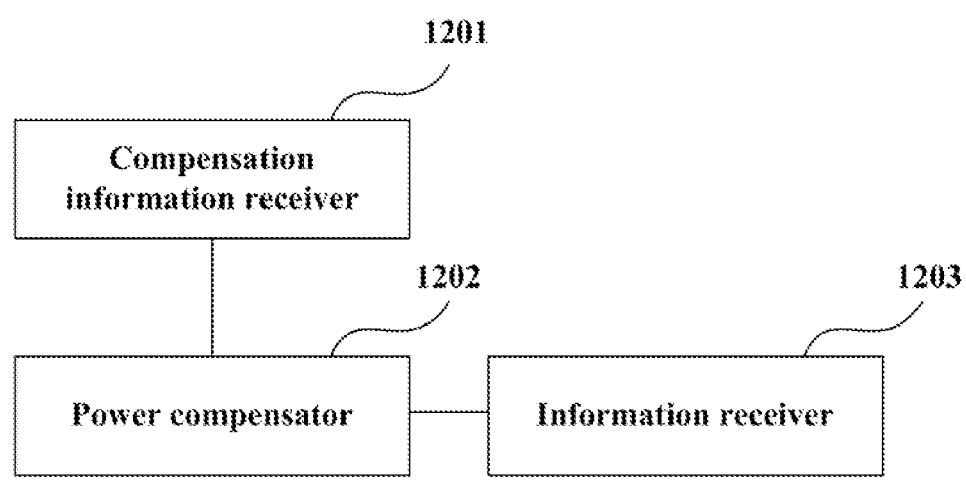
FIG. 12 is a schematic diagram of the structure of the terminal equipment of Embodiment 10 of the present invention.

FIG. 12 is a schematic diagram of the structure of the terminal equipment of Embodiment 10 of the present invention. As shown in FIG. 12, user equipment 100 according to an embodiment of the present invention is provided, the terminal equipment including a compensation information receiver 1201 and a power compensator 1202; wherein, the compensation information receiver 1201 is configured to receive, a fifth ratio transmitted by a base station, of the EPRE of an expanded UE-specific downlink control channel to the EPRE of a demodulation reference signal in a first time slot occupied by the expanded UE-specific downlink control channel, or receive a sixth ratio transmitted by the base station, of the EPRE of the demodulation reference signal in the first time slot occupied by the expanded UE-specific downlink control channel to the EPRE of the demodulation reference signal in the second time slot, or receive a power compensation value transmitted by the base station; and the power compensator 1202 is configured to perform power compensation, by using the fifth ratio, the sixth ratio, or the power compensation value, when decoding the received PDCCH data or PDSCH data, or perform power compensation to the received DM-RS channel estimation.

As shown in FIG. 12, the terminal may further include an information receiver 1203 configured to receive a pilot signal and a data signal transmitted by the base station.

Figure 13:
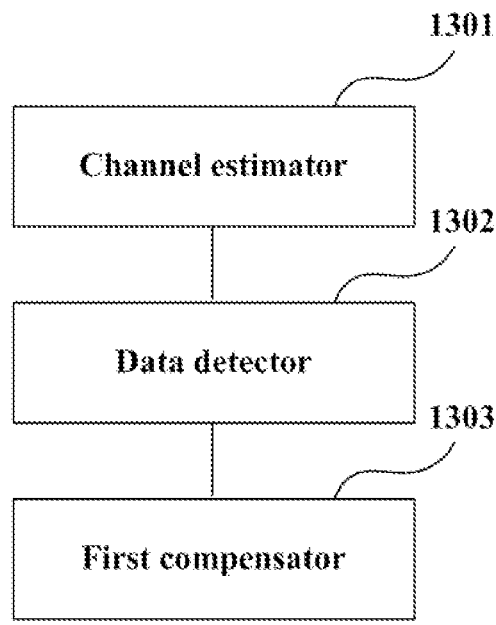
FIG. 13 is a schematic diagram of the structure of the power compensator 1202 of Embodiment 10 of the present invention.

Wherein, in the case where power compensation is performed in decoding the received PDCCH or PDSCH data, FIG. 13 is a schematic diagram of the structure of the power compensator 1202 of Embodiment 10 of the present invention. As shown in FIG. 13, the power compensator 1202 includes:

a channel estimator 1301 configured to perform channel estimation to a wireless attenuation channel;

a data detector 1302 configured to perform data detection to a data signal based on the result of channel estimation; and a first compensator 1303 configured to perform power compensation to the data detected by the data detector by using the first ratio or the power compensation value.

Performing power compensation in decoding the PDCCH or PDSCH data as described above is similar to Embodiment 5, which shall not be described herein any further.

Figure 14:
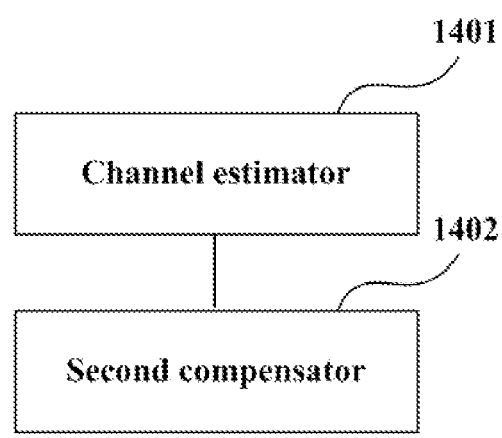
FIG. 14 is a schematic diagram of the structure of the power compensator 1202 of Embodiment 10 of the present invention.

Furthermore, in the case where power compensation is performed to the received DM-RS channel estimation, FIG. 14 is a schematic diagram of the structure of the power compensator 1202 of Embodiment 10 of the present invention. As shown in FIG. 14, the power compensator 1202 includes:

a channel estimator 1401 configured to perform channel estimation to a wireless attenuation channel; and a second compensator 1402 configured to perform power compensation to the result of channel estimation by using the second ratio or the power compensation value.

It can be seen from the above embodiment that the terminal equipment performs power compensation in decoding the received data by using the first ratio, or the second ratio, or the power compensation value of the UE-specific PDCCH of the region of the first time slot, thereby ensuring correct demodulation of the received data.

An embodiment of the present invention further provides a computer-readable program, wherein when the program is executed in a base station, the program enables a computer to carry out the power compensation method as described in embodiments 1-4 in the base station.

An embodiment of the present invention further provides a storage medium in which a computer-readable program is stored, wherein the computer-readable program enables a computer to carry out the power compensation method as described in embodiments 1-4 in a base station.

An embodiment of the present invention further provides a computer-readable program, wherein when the program is executed in a terminal, the program enables a computer to carry out the power compensation method as described in embodiment 5 in the terminal An embodiment of the present invention further provides a storage medium in which a computer-readable program is stored, wherein the computer-readable program enables a computer to carry out the power compensation method as described in embodiment 5 in a terminal The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A base station, comprising:
   a first resource configurator, configured to expand a UE-specific downlink control channel region to a downlink shared channel region, the expanded UE-specific downlink control channel region being configured in a first time slot of one or more resource block pairs;
   a first judger, configured to judge that a modulation mode of the expanded UE-specific downlink control channel is amplitude phase keying; and
   a first compensation information transmitter, configured to transmit to a terminal, when the judging result of the first judger is that the expanded UE-specific downlink control channel is amplitude phase keying modulated, a first ratio of an Energy Per Resource Element (EPRE) of the expanded UE-specific downlink control channel to the EPRE of a demodulation reference signal in the first time slot occupied by the expanded UE-specific downlink control channel, the first ratio being provided to the terminal for power compensation for decoding a received downlink control channel data transmitted by the base station, wherein the judging result of the first judger is that the expanded UE-specific downlink control channel is amplitude phase keying modulated;
   a second judger configured to judge that the downlink shared channel region is multiplexed in the one or more resource block pairs and is configured in regions of a second time slot of the one or more resource block pairs and to judge that the power of a demodulation reference signal in the first time slot occupied by the expanded UE-specific downlink control channel is different from the power of a demodulation reference signal in the second time slot occupied by the downlink shared channel;
   a second compensation information transmitter, configured to transmit to the terminal, a second ratio of an EPRE of the demodulation reference signal in the first time slot occupied by the expanded UE-specific downlink control channel to the EPRE of the demodulation reference signal in the second time slot, the second ratio being provided to the terminal for power compensation for performing channel estimation to a received demodulation reference signal.

2. The base station according to claim 1, wherein the base station further comprises: a modulation information transmitter, configured to transmit to the terminal, information including a modulation mode.

3. The base station according claim 1, wherein part or whole of the downlink shared channel region is configured in the region of the second time slot of the one or more resource block pairs; or the downlink shared channel region is not configured at the one or more resource block pairs.

4. A terminal, comprising:
   a compensation information receiver, configured to receive, a fifth ratio transmitted by a base station, of an Energy Per Resource Element (EPRE) of an expanded UE-specific downlink control channel to the EPRE of a demodulation reference signal in a first time slot occupied by the expanded UE-specific downlink control channel, or receive a sixth ratio transmitted by the base station, of the EPRE of a demodulation reference signal in the first time slot occupied by the expanded UE-specific downlink control channel to the EPRE of a demodulation reference signal in a second time slot, or receive a power compensation value transmitted by the base station; and
   a power compensator, configured to perform power compensation, by using the received fifth ratio, the sixth ratio, or the power compensation value, when decoding the received downlink control channel data or downlink shared channel data transmitted by the base station, or when performing channel estimation to the received demodulation reference signal;
   the compensation information receiver receives the fifth ratio for power compensation for decoding the received downlink control channel data, wherein the expanded UE-specific downlink control channel is Amplitude Phase Keying (APK) modulated; and
   the compensation information receiver receives from the base station, the sixth ratio to perform channel estimation to a received demodulation reference signal, wherein the downlink shared channel region is multiplexed in the one or more resource block pairs and is configured in regions of a second time slot of the one or more resource block pairs and the power of a demodulation reference signal in the first time slot occupied by the expanded UE-specific downlink control channel is different from the power of a demodulation reference signal in the second time slot occupied by the downlink shared channel.

* * * * *